United States Patent Office 2,917,546
Patented Dec. 15, 1959

2,917,546

MANUFACTURE OF SYM-TETRAFLUORO-ACETONE

Joseph Gordon and Cyril Woolf, Morristown, N.J., assignors to Allied Chemical Corporation, New York, N.Y., a corporation of New York No Drawing. Application May 14, 1958
Serial No. 735,121

6 Claims. (Cl. 260—593)

This invention is directed to processes for making sym-tetrafluoroacetone $CHF_2.CO.CHF_2$. More particularly, the invention relates to preparation of sym-tetrafluoroacetone by catalytic gas-phase reaction of sym-tetrafluorodichloroacetone, $CClF_2.CO.CClF_2$, and hydrogen.

It has been found that by use of a particular organic starting material, namely, sym-tetrafluorodichloroacetone, and certain catlytic gas-phase reaction conditions, it is possible to make sym-tetrafluoroacetone from sym-tetrafluorodichloroacetone and hydrogen by an easily controllable gas-phase reaction without hydrogen attack on the carbonyl group or on the fluorine atoms within the $CClF_2.CO.CClF_2$ molecule. Hence, the invention includes the selection of certain chlorofluorocarbon starting material and the discovery of particular catalytic reaction conditions which together afford accomplishment of the invention objectives.

Sym-tetrafluorodichloroacetone at ordinary conditions is a substantially colorless liquid of the compositions $CClF_2.CO.CClF_2$ and having boiling point of about 44° C. This compound may be made for example by effecting reaction between anhydrous HF and hexachloroacetone at moderately elevated temperature while in the presence of antimony pentahalide, and while maintaining the reaction mass substantially in the liquid phase, and thereafter recovering the $CClF_2.CO.CClF_2$ from the reaction products by suitable procedure such as distillation. U.S. Patent 2,741,634 of April 10, 1956, discloses procedure for making sym-tetrafluorodichloroacetone, $CClF_2.CO.CClF_2$.

This invention comprises subjecting vapor-phase $CClF_2.CO.CClF_2$ to the action of hydrogen in quantity sufficient to react with a substantial amount of $CClF_2.CO.CClF_2$ starting material while maintaining temperature high enough to keep all starting material and products formed in the vapor phase, and while in the presence of a supported metallic palladium catalyst, and thereafter recovering $CHF_2.CO.CHF_2$ from the resulting reaction product. The process of the invention appears to be represented theoretically by

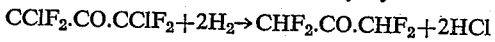

The invention includes the discovery of a catalyst which, not only controls the course of reaction of vapor-phase $CClF_2.CO.CClF_2$ and hydrogen, but possesses inherent characteristics and properties such that, notwithstanding a high concentration of halogen acid (HCl) in the reaction products, the catalyst is not poisoned thereby. This catalyst comprises metallic palladium carried on a suitable support which may be activated carbon or an inorganic salt such as calcium fluoride. With regard to preparation of the catalyst, a water-soluble palladium salt which is capable of reduction to elemental palladium by hydrogen may be employed. Readily available palladium chloride is preferred. Any of the commercial activated carbons may be used, e.g. Columbia 6G carbon, Columbia SW carbon, or Darco carbon. If desirable, the activated carbon, e.g. 8–14 mesh, may be treated preliminarily to remove any silica by leaching with aqueous HF, water washing, and drying. The granular, activated carbon support may be immersed in an aqueous solution of palladium chloride. The carbon, carrying absorbed palladium chloride, is separated from the water and preliminarily dried at about 120° C. The catalyst may then be heated at temperatures of say 150–300° C. in a stream of hydrogen to eliminate water and reduce the palladium salt to elemental palladium. The amounts of palladium chloride employed may be such that the finished palladium on activated carbon catalyst contains substantially in the range of 0.5–10 weight percent of metallic palladium, balance carbon. The preferred range of palladium concentration, to obtain optimum results, lies substantially in the range of about 1–5 weight percent of palladium.

Practice of the invention procedurally comprises passing a gas-phase mixture of sym-tetrafluorodichloroacetone and hydrogen thru a reaction zone containing the catalyst indicated and maintained at certain relatively low but elevated temperatures, and recovering sym-tetrafluoroacetone from the reaction zone exit. Apparatus may comprise preferably a tubular reactor, made of nickel or other suitable material such as stainless steel and Monel, mounted in a furnace provided with means for maintaining the reaction zone in the reactor at the desired elevated temperature. The reactor may include inlets for introduction of controlled quantities of hydrogen and vaporous sym-tetrafluorodichloroacetone, and may be provided with a reaction product exit connected to a product recovery system.

In accordance with the invention, it has been found that, in order to prevent attack on the carbonyl group or upon the fluorine atoms within the acetone molecule, reaction should be effected, in conjunction with the particular supported palladium catalysts described, at temperature high enough to maintain the $CClF_2.CO.CClF_2$ input and resulting reaction products in the gas phase. More desirably, internal reaction zone temperatures should be not less than about 125° C., and significant reaction and formation of $CHF_2.CO.CHF_2$ are effected at this low temperature. Substantial yields may be obtained with reaction temperatures as high as about 350° C., although because of decompositions and side reactions, higher temperatures are not preferred and no appreciable advantages result. The invention, while a gas-phase catalytic operation, affords the advantages of relatively low temperatures, and preferred temperatures lie in the range of about 150–250° C.

Hydrogen may be employed in any quantity sufficient to react with a significant amount of $CClF_2.CO.CClF_2$ starting material. Theoretical quantities of reactants are in $CClF_2.CO.CClF_2$:$H_2$ molar proportions of about 1:2. However, experience shows that for reasonably good conversions and yields, hydrogen should be employed in quantity substantially in excess of theory, and it has been found that such excess ordinarily should be at not less than about 50% of theory. Hence, in practice it is preferred to use organic starting material and hydrogen in molecular proportions of not less than about 3 mols of hydrogen to one mol of $CClF_2.CO.CClF_2$ starting material. Preferred molar proportions are those in which the quantity of hydrogen employed is substantially in the range of 3–4.5 mols per mol of $CClF_2.CO.CClF_2$.

Operation is preferably carried out at substantially atmospheric pressure. However, elevated pressure may be employed if desired, provided temperatures are adjusted so as to maintain all the organics in the reaction zone in the gas phase.

Reaction or contact time necessary to effect the desired degree of reaction is dependent to some extent upon temperature and palladium concentration of the catalyst. Thus, increasing temperature, quantity of catalyst, and catalyst concentration with respect to palladium facilitate shorter contact time, and vice versa. Contact time may lie in the range of 1–25 seconds, preferably 5–10 seconds. However, for any given set of operating conditions, optimum contact times may be determined by test runs.

Products exiting the reaction zone consist principally of the sought-for $CHF_2.CO.CHF_2$, unreacted starting material, hydrogen chloride and unreacted hydrogen. The organic portion of the reactor exit may be isolated by suitable cooling, such as by a Dry Ice acetone trap. With this procedure, unreacted hydrogen and the major part of the HCl by-product pass thru the trap, while $CHF_2.CO.CHF_2$ product and unreacted $CClF_2.CO.CClF_2$ are retained as condensate. Exit of the trap may be water-scrubbed to recover HCl. The $CHF_2.CO.CHF_2$ product may be separated from the condensate by fractional distillation at substantially atmospheric pressure. The initial phase of distillation effects release from the condensate of dissolved HCl which may be led off into the water scrubber and recovered.

Sym-tetrafluorodichloroacetone starting material boils at about 44° C. at atmospheric pressure. A forerun, distilling out material boiling up to a little less than about 57° C., separates out substantially all unreacted $CClF_2.CO.CClF_2$. Liquor left in the still after removal of the forerun represents conversion products. Thereafter, there is recovered as condensate a colorless liquid boiling substantially in the range of about 57–60° C., which condensate comprises the $CHF_2.CO.CHF_2$ product in a more or less crude condition. This condensate may be redistilled under careful conditions to recover a cut boiling at 59° C.±1° C., which material is a colorless liquid shown by analysis including infrared spectograms to be substantially pure, anhydrous $CHF_2.CO.CHF_2$. This material is a colorless liquid having a pungent odor and a boiling point of 59° C. at standard conditions. Density at 80° F., compared with water at 60° F., is 1.495. The material reacts exothermically with water to form the hydrate, and reacts characteristically as a ketone in organic reactions. The still residue remaining after separation of the 57–60° C. boiling range fraction comprises higher boilers boiling in the range of a little above 60° C. up to about 115° C. The major weight proportion of this higher boiling material is $CHF_2.CO.CHF_2$ constituent, tied up as one-water hydrate.

In the following examples, conversion is intended to indicate the percent by weight of organic starting material which reacted, and yield indicates percent by weight of reacted starting material which is changed into sought-for product.

*Example 1.*—150 cc. (36 g.) of Columbia 6G activated carbon pellets, of size to pass about 8 mesh and impregnated with metallic palladium as above described in such a way that the catalyst contained 2% by weight of palladium, were charged into a 1-inch I.D. horizontally disposed tubular nickel reactor heated externally over about 36 inches of length by an electric furnace provided with automatic temperature control. The catalyst, which had previously been used for about 10 hours in a similar run, was disposed in a central 29 inch long length of the reactor. During 10 hours, 2.96 mols (590 g.) of vaporized $CClF_2.CO.CClF_2$ and 12.2 mols (24.4 g.) of hydrogen, mol ratio of sym-tetrafluorodichloroacetone:$H_2$ 1:4.1, were passed simultaneously in separately metered streams at about constant rate into the reactor. Reaction was moderately exothermic, and temperature, as measured by an internally disposed thermocouple, was maintained in the range of 154–168° C. throughout the run. Contact time was about 10 seconds. Exit products from the reactor were passed thru a Dry Ice-acetone trap. Residual hydrogen and HCl discharged from the trap were water-scrubbed to absorb the HCl, and unreacted hydrogen exiting the water scrubber amounted to 38.5 liters, 1.6 mols. The condensate recovered in the Dry Ice trap was fractionally distilled at substantially atmospheric pressure. Initially, some dissolved HCl was removed from the condensate. Titration of the scrub water showed a content of about 4 mols of HCl. A forerun of about 170 g. boiling up to a little less than 57° C. was recovered and comprised mostly material boiling at about 44–46° C., i.e. unreacted organic starting material. After forerun removal, there were obtained about 170 g. of colorless condensate boiling substantially in the range of 57–60° C., and about 50 g. of still residue boiling substantially in the range of a little above 60° C. up to about 115–116° C. Conversion (total material boiling above about 57° C.) was about 71%. Analysis of the 57–60° C. fraction, by chemical and infrared spectrogram methods, showed keto group, infrared spectrogram methods, showed keto group, presence of hydrogen, no alcohol and no chloride, and formation of the hydrazone (when treated with 2,4-dinitrophenylhydrazine) thus demonstrating that the 170 g. of material was sym-tetrafluoroacetone. This 57–60° C. fraction was redistilled to obtain a condensate boiling at 59° C. Yield of the sym-tetrafluoroacetone, on the basis of this fraction, was 41%.

*Example 2.*—The catalyst employed was the catalyst of Example 1, which catalyst had been used for 21 hours. During 11 hours, 5.7 mols (1113 g.) of vaporized $CClF_2.CO.CClF_2$ and 22.2 mols (44.4 g. of hydrogen, mol ratio of sym-tetrafluorodichloroacetone:$H_2$ 1:3.9, were passed simultaneously in separately metered streams at about constant rate into the reactor. Temperature was maintained in the range of 157–174° C. throughout the run. Contact time was about 6 seconds. Exit products from the reactor were passed thru a Dry Ice trap and then thru a water-scrubber to absorb the HCl. Unreacted hydrogen exiting the water scrubber amounted to 170 liters, 7.1 mols. The condensate recovered in the Dry Ice trap was fractionally distilled at substantially atmospheric pressure. Initially, some dissolved HCl was removed from the condensate. Titration of the scrub water showed a content of about 8.25 mols of HCl. A forerun of about 360 g. boiling up to a little less than 57° C. was recovered and comprised mostly material boiling at about 44–46° C., i.e. unreacted organic starting material. After forerun removal, there were obtained about 334 g. of colorless condensate boiling in the approximate range of about 57–60° C., and about 75 g. of still residue boiling substantially in the range of a little above 60° C. up to about 110° C. Conversion was about 64%. Analysis showed that the 334 g. of material was sym-tetrafluoroacetone. This 57–60° C. fraction was redistilled to obtain a condensate boiling at 59° C. Yield of the sym-tetrafluoroacetone, on the basis of this fraction, was 48%.

*Example 3.*—The catalyst employed was the same catalyst used in Examples 1 and 2. During 10½ hours, 5.17 mols (1030 g.) of vaporized $CClF_2.CO.CClF_2$ and 18.8 mols (37.6 g.) of hydrogen, mol ratio of sym-tetrafluorodichloroacetone:$H_2$ 1:3.6, were passed simultaneously in separately metered streams at about constant rate into the reactor. Temperature was maintained in the range of 171–193° C. throughout the run. Contact time was about 5.5 seconds. Exit products from the reactor were handled as before. Unreacted hydrogen exiting the water scrubber amounted to 168 liters, 7 mols. The condensate recovered in the Dry Ice trap was fractionally distilled at substantially atmospheric pressure. Initially, some dissolved HCl was removed from the condensate. Titration of the scrub water showed a content of about 8.6 mols of HCl. A forerun of about 215 g. boiling up to a little less than 57° C. was recovered and comprised mostly unreacted starting material boiling at about 44–46° C. After forerun removal, there were obtained about 380 g. of colorless condensate boiling substantially in the range of 57–60° C., and about 114 g. of still residue boiling substantially in the range of a little above 60° C. up to about 116° C. Conversion was about 79%. Analysis showed that the 380 g. of material was sym-tetrafluoroacetone. This 57–60° C. fraction was redistilled to obtain a condensate boiling at 59° C. Yield of the sym-tetrafluoroacetone, on the basis of this fraction, was about 47%.

The sym-tetrafluoroacetone of the invention has a reactive keto group which reacts readily with water, inorganic and organic bases, and reagents known in the art, and hence is a valuable chemical intermediate.

This application is a continuation-in-part of our copending application Serial No. 660,046, filed May 20, 1957, now abandoned.

We claim:

1. The process for making $CHF_2.CO.CHF_2$ which comprises subjecting vapor-phase $CClF_2.CO.CClF_2$ to the action of hydrogen in amount in excess of two molecular proportions of hydrogen per mol of $CClF_2.CO.CClF_2$ while maintaining temperature not less than about 125° C. and while in the presence of a supported palladium catalyst; and recovering $CHF_2.CO.CHF_2$ from the resulting reaction product.

2. The process of claim 1 in which temperature is substantially in the range of 125–350° C.

3. The process for making $CHF_2.CO.CHF_2$ which comprises subjecting vapor-phase $CClF_2.CO.CClF_2$ to the action of not less than about 3 molecular proportions of hydrogen per mol of said $CClF_2.CO.CClF_2$ while maintaining temperature not less than about 125° C. and while in the presence of a supported palladium catalyst; and recovering $CHF_2.CO.CHF_2$ from the resulting reaction product.

4. The process for making $CHF_2.CO.CHF_2$ which comprises subjecting vapor-phase $CClF_2.CO.CClF_2$ to the action of not less than about 3 molecular proportions of hydrogen per mol of said $CClF_2.CO.CClF_2$ while maintaining temperature substantially in the range of 125–350° C. and while in the presence of a supported palladium catalyst containing not more than about 10% by weight of palladium, and recovering $CHF_2.CO.CHF_2$ from the resulting reaction product.

5. The process for making $CHF_2.CO.CHF_2$ which comprises subjecting vapor-phase $CClF_2.CO.CClF_2$ to the action of hydrogen in quantity substantially in the range of 3–4.5 mols per mol of $CClF_2.CO.CClF_2$ while maintaining temperature substantially in the range of 150–250° C. and while in the presence of a palladium on activated carbon catalyst containing about 1–5% by weight of palladium, and recovering $CHF_2.CO.CHF_2$ from the resulting reaction product.

6. The process of claim 4 in which the catalyst is palladium on activated carbon.

References Cited in the file of this patent

Shoesmith et al.: J. Chem. Soc. (London) 1926, pp. 2760–1.